(12) United States Patent  
Mahalingaiah

(10) Patent No.: US 8,769,331 B1
(45) Date of Patent: Jul. 1, 2014

(54) METHOD AND APPARATUS FOR SECURING DIGITAL DEVICES WHILE REDUCING POWER CONSUMPTION

(76) Inventor: Rupaka Mahalingaiah, Austin, TX (US)

( * ) Notice: Subject to any disclaimer, the term of this patent is extended or adjusted under 35 U.S.C. 154(b) by 153 days.

(21) Appl. No.: 13/338,537

(22) Filed: Dec. 28, 2011

(51) Int. Cl.
*G06F 1/00* (2006.01)
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl.
USPC ............................................. 713/500; 726/19

(58) Field of Classification Search
CPC ........................................................ G06F 1/08
USPC ........................................... 726/19; 713/500
See application file for complete search history.

(56) References Cited

U.S. PATENT DOCUMENTS

| 2007/0150842 A1* | 6/2007 | Chaudhri et al. ............. 715/863 |
| 2013/0076417 A1* | 3/2013 | Kris .............................. 327/160 |
| 2013/0111579 A1* | 5/2013 | Newman et al. ................ 726/17 |

OTHER PUBLICATIONS

Clock Network and Phase-Locked Loop Power Estimation and Experimentation David Enrique Duarte May 2002.*

* cited by examiner

*Primary Examiner* — Kambiz Zand
*Assistant Examiner* — Benjamin Kaplan

(57) ABSTRACT

A mechanism to generate clocks when there is no security breach is contemplated. Using the conditional generation of clocks for synchronous digital designs, the invention enables mechanisms to secure Mobile Devices. When a potential security breach is detected, clock generation to at least a portion of the Mobile Device is disabled. The invention also contemplates mechanisms to re-enable the Mobile Device when the security risk is resolved.

20 Claims, 12 Drawing Sheets

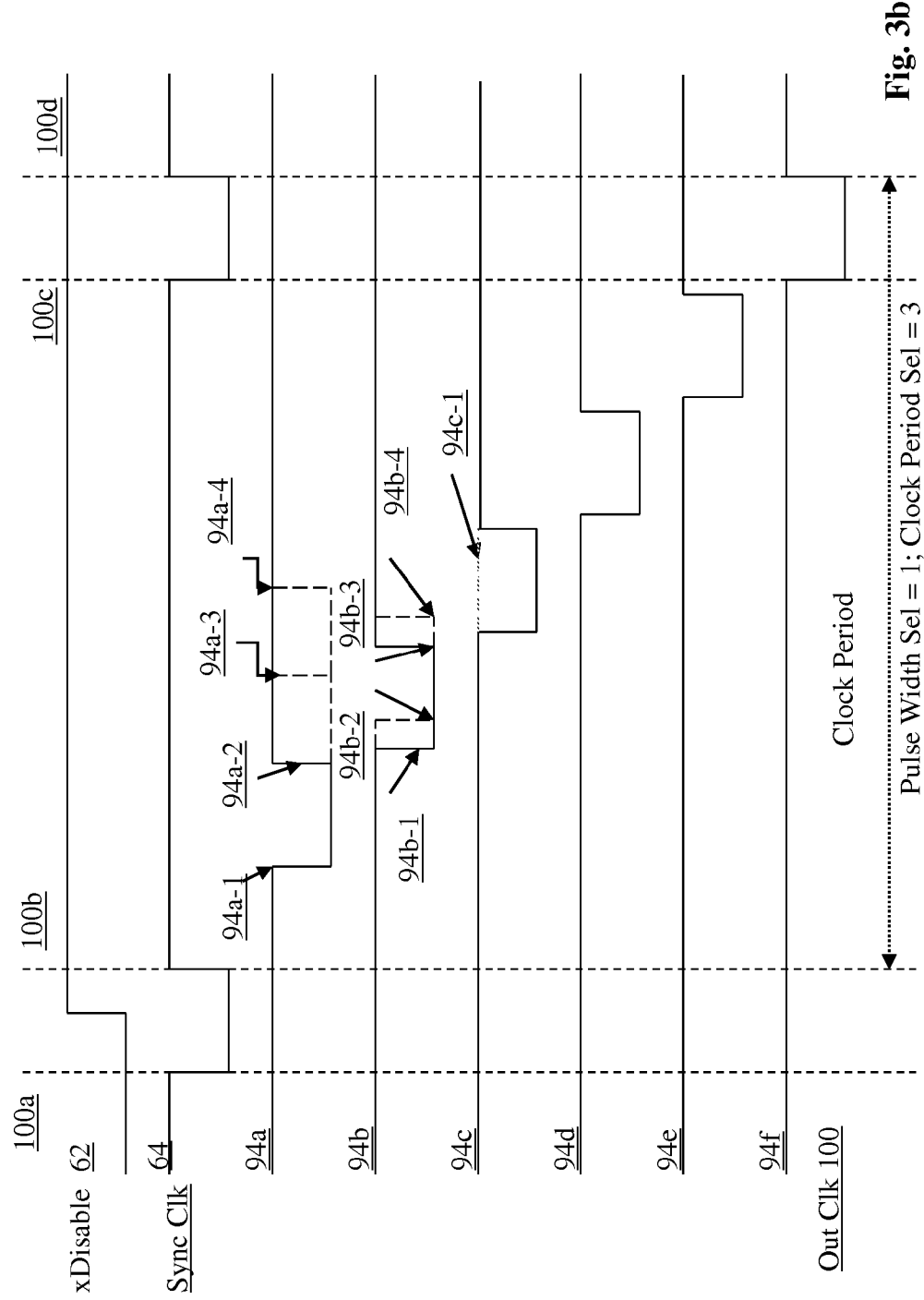

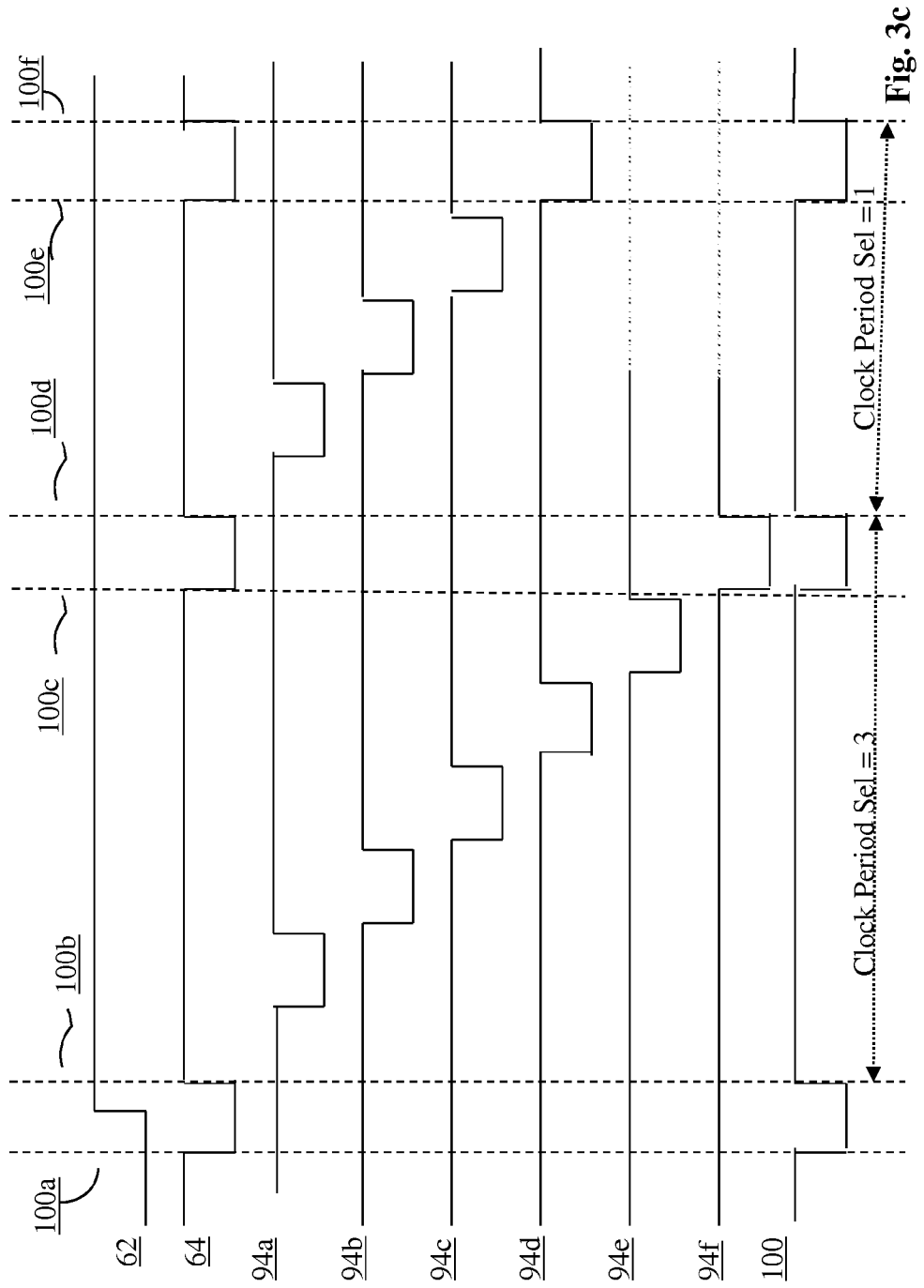

METHOD AND APPARATUS FOR SECURING DIGITAL DEVICES WHILE REDUCING POWER CONSUMPTION

BACKGROUND OF THE INVENTION

1. Field of the Invention

This invention relates to digital systems (such as mobile devices, processors, memory devices, and computer systems) and, more particularly, to mechanisms and techniques to secure the devices by controlled generation of clocks.

2. Brief Description of the Related Technology

Electronic digital computational devices like computers, laptops, netbooks, PDAs, memories, handheld, smart phones, and mobile digital devices (collectively called 'Mobile Devices') have become the critical part of many businesses. In the personal lives, they have become essential tools of practically everyone, touching nearly all aspects of life. Availability and affordability of these devices have resulted in them being used in many business and personal applications. With this popular trend, comes the need for securing these Mobile Devices.

In a business atmosphere, these Mobile Devices frequently contain secure information that relates to the businesses. The Mobile Devices typically have the ability to connect to the servers and enterprise information technology infrastructure (collectively called 'Enterprise Server') to communicate and access information on the server. They also store and retain confidential information on their local storage units.

In personal life, these devices contain personal information some of which is sensitive. With the information available in these devices, people are prone to be victims of crimes such as identity theft, if the device falls into wrong hands. Mobile Devices are also used more and more to conduct financial transactions increasing the potential risks.

These Mobile Devices are inherently prone to being misplaced, dropped, lost, or stolen. Potential compromise of data retained internally is resulting in high risk for both business and personal applications.

In a business environment, perpetrators can also access the Enterprise Server by using these lost devices. It is possible to compromise the entire IT infrastructure of a business by lost Mobile Devices.

There is a critical need for comprehensive security solutions that secure both transmitted and stored information in the Mobile Devices. Development of a suitable security solution will demand creativity and innovation as the resultant approach must be viable and at the same time not add significantly to the Mobile Devices' computational load or otherwise degrade device functionality and responsiveness.

There are many security mechanisms for securing Mobile Devices. The first and foremost is protecting the devices with passwords. This simple technique can protect both the Enterprise Server and the Mobile Device from casual intrusions. However, this will not be able effective against serious hackers.

There are several data encryption techniques that are used in high-end laptop and desktop computers. However, these are not best suited for Mobile Devices, as the computational workload may be excessive. Similarly, addition of available wireless network encryption hardware is undesirable as battery run-time is yet another issue that is critical in Mobile Devices. Added hardware will shorten device runtime and increase the frequency of recharge.

It is critical to avoid adverse impact on device's power and real estate when securing Mobile Devices. Security mechanisms should not hinder the performance of Mobile Devices, reduce the battery life, or increase their physical size.

For business applications, industry has introduced techniques like Remote Wiping to protect Mobile Devices. This typically involves the Enterprise Server wiping out the Mobile Device clean when potential hackers activate the lost Mobile Device. This technique is effective in protecting the Enterprise Server from many potential perpetrators. However, there are several vulnerabilities with this technique. The information on the Mobile Device can be stolen without activating the device. A technically savvy hacker may be able to access the Enterprise Server without activating Mobile Device by using the information contained in the Mobile Device. Also, this technique is not beneficial for standalone Mobile Devices that are common in personal applications.

Some Mobile Devices have hardware keys such as an USB device or a RF key to protect them from potential hackers. These can be cumbersome to the normal user and also present the opportunity of being stolen or lost along with the Mobile Device.

A more secure mechanism is desirable for security critical applications. To provide a high level of security, using complex algorithms and encryption algorithms in software will be power and resource prohibitive in Mobile Device. Alternative to software techniques are the hardware techniques that can provide higher level of security. However, using special hardware techniques by adding hardware into Mobile Devices is not acceptable due to power and resource constraints.

It will be advantageous to have simple techniques that will enable robust security, yet, not compound the resource and power issues of Mobile Devices. Towards keeping the resource requirement to a minimum, it will be advantageous for any new mechanism to make use of existing resources in the Mobile Devices.

It is possible to use the power management schemes of the Mobile Devices to secure it. One possibility is to use the clock disabling mechanism of the power management scheme to lock the Mobile Device when a security breach is detected. While this uses the existing resources within the Mobile Device, it will not assist in power reduction.

It will be advantageous to have a security locking mechanism that will also help in Mobile Device operation such as power management, performance, and speed.

SUMMARY OF THE INVENTION

The problems outlined above are in large part solved by a design in accordance with the various embodiments of this invention. Embodiments of this invention are adaptable for use in any Mobile Device, computer systems, or other digital designs.

In particular, the invention contemplates using a self-clock mechanism that will conditionally generate clocks when there is a valid operation to be performed by authenticated user. This mechanism will enable a power reduction mechanism that also secures the Mobile Device.

The innovative clocking mechanism for digital designs and Mobile Devices contemplated in this invention provides security and power saving techniques that would dramatically reduce the power consumption of the devices and provide unprecedented security. This innovative mechanism provides a secure, local, self-generated, distributed, multi pulse based clocking scheme that can incorporate control and functional information with it. This clock is referred to herein as a secure-local-clock.

Most digital designs of today, including processors, computer systems, memory subsystems, and Mobile Devices are based on synchronous design methodology. The term "synchronous design" generally refers to the method employed to control the timing of the design. A clock (a signal with deterministic period of state change) generally controls the time at which the events are executed within a synchronous digital design in a deterministic fashion. All timed elements in synchronous digital designs use clocking mechanism for their operation. One or more clocks control the operation of all clocked units in the system. In addition to driving the operation of each unit in a system, clocks also guarantee the time synchronization of various units within the design. Most digital designs of today use this methodology and there is a wealth of Computer Aided Design (CAD) tools and verification tools and methodology to support this.

A digital design typically has a centralized clock system with a well-balanced clock tree controlling, coordinating, and synchronizing the entire design. Typically, free-running clock tree can account for 30-40% of the power in high performance designs of today. To reduce this power consumption, many clock management schemes are available. This often involves of implementing mechanisms to disable clocks by generating signals that enable or disable clocks. These signals are gated with respective clocks to control the enabling or disabling of the clock.

Mobile Devices are especially sensitive to power consumption. Extending the life of battery and/or lowering the power consumption are crucial for Mobile Devices. Mobile Devices implement power management techniques to reduce power consumption. Controlling the clocks is an important part of the power reduction techniques deployed in Mobile Devices.

This invention provides various embodiments of mechanisms to generate clock only when there is a need to perform a valid operation. The problem of potential security breach by compromised Mobile Device is in large part solved in embodiments of this invention by disabling the generation of secure-local-clock when there is no authorized access.

Embodiments of this invention contemplate mechanisms to detect potential security breach. Various embodiments of the invention further contemplate mechanisms to lock the Mobile Device by disabling the generation of secure-local-clock to one or more units in the Mobile Device. Various embodiments of invention further contemplate mechanisms to re-enable the Mobile Devices if and when the security risk is resolved.

In one embodiment, the invention provides a Mobile Device comprising of an application processor, a power management unit, a display, a network interface, a memory system, a keyboard and touchscreen, a USB port, audio devices, camera, and a clock generation unit that stop normal operations when a potential security breach is detected.

In another embodiment, the invention provides Mobile Device with a mechanism to generate secure-local-clock when needed. In another embodiment, the invention provides mechanisms to stop the generation of this secure-local-clock in one or more of the units of the Mobile Device.

In one embodiment, the invention provides Mobile Device with a mechanism to stop the generation of secure-local-clock by detecting the potential breach from the CPU of the application processor.

While this preferred embodiments of the invention are primarily beneficial in Mobile Devices, other embodiments of the invention further contemplates using the mechanism for desktop and other computing devices with communication capabilities. Embodiments of this invention will secure the Enterprise Server that has one or more devices that connect to it remotely. Other embodiments of the invention can be used in any remote connectivity applications to prevent security breach.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted, that the appended drawings only illustrate the typical embodiments of the invention and therefore should not to be considered limiting of its scope, for the invention may admit to other equally effective embodiments.

FIG. 3b is a timing diagram of generating one cycle of secure-local-clocks in accordance with the present invention.

FIG. 3c is a timing diagram of generating multiple cycles of secure-local-clocks with varying clock periods.

DETAILED DESCRIPTION OF THE INVENTION

Figure 1:
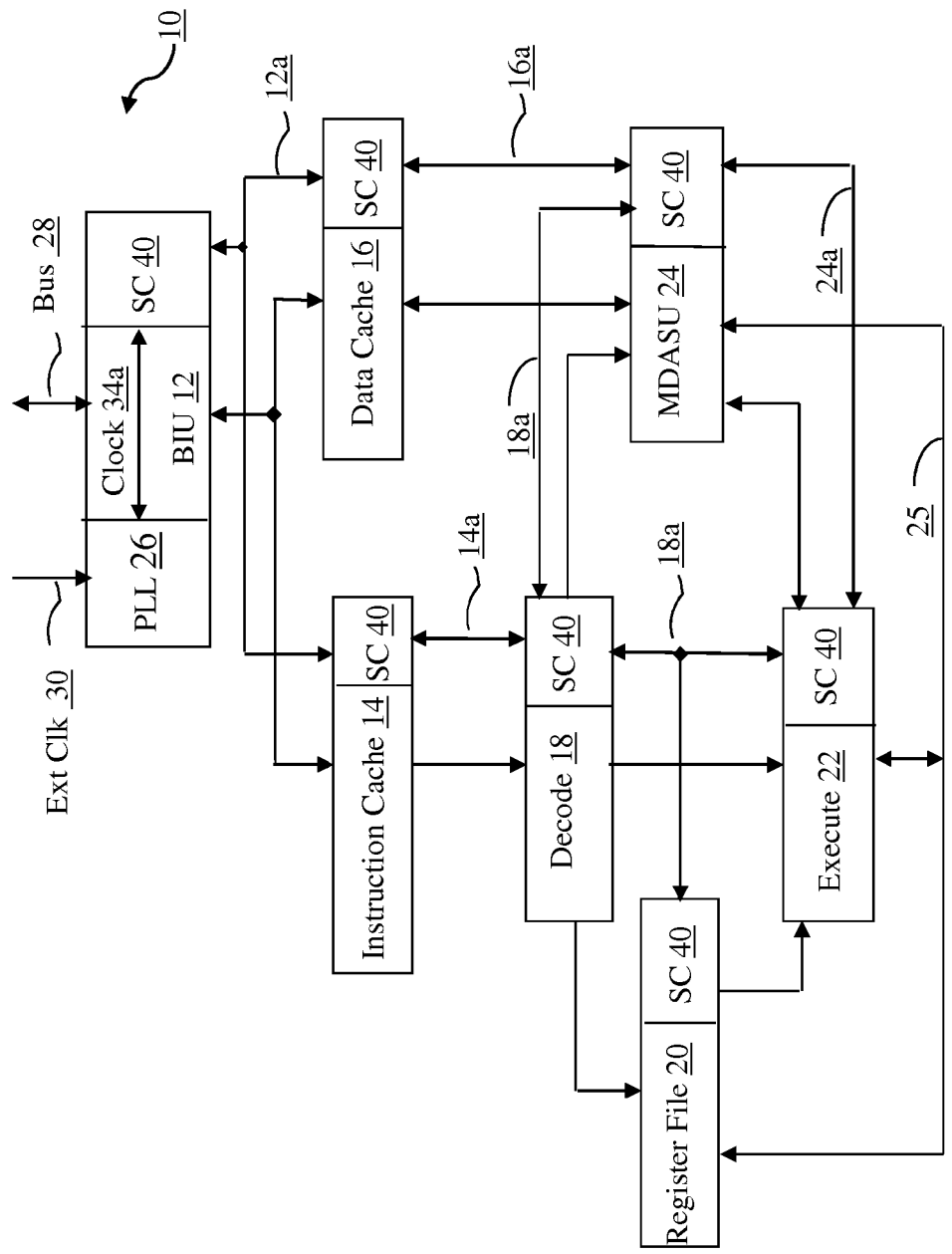
FIG. 1 is a block diagram of one embodiment of a typical processor configured with secure-local-clocks in accordance with the present invention.

While the invention is susceptible to various modifications and alternative forms, specific embodiments thereof are shown by the way of example in the drawing and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The secure-local-clocks of this invention are applicable to all digital ICs such as custom chips, Application Specific ICs (ASIC), and Field Programmable Gate Arrays (FPGA). It is applicable to all digital design such as processing units, memory systems, communication system, and I/O systems.

Referring now to FIG. 1, a block diagram of an embodiment of a processor 10 is shown. A simple embodiment is shown to assist in the description of the present invention. The invention applies equally well to all embodiments synchronous digital designs. It should be noted that the present invention applies well to all complex microprocessors, graphic processors, network processors as well as computer systems, networking systems, memory systems, I/O systems and other digital systems.

As shown in FIG. 1, processor 10 comprise of multiple digital functional units such as, a Bus Interface Unit (BIU) 12, an instruction cache 14, a data cache 16, a decode unit 18, a register file 20, an execution unit 22, and a Memory Data Access Control Unit (MDACU) 24. The processor 10 interfaces with the external world through a Bus 28.

The external clock 30 governs the functioning of processor 10 in time domain. In one embodiment, an internal Phase Locked Loop (PLL) 26 generates an internal clock 34 for processor 10 in synchronization with external clock 30.

Instruction cache 14 and data cache 16 are coupled to receive instructions and data respectively from the main memory subsystem (not shown) through the BIU 12. Decode unit 18 is coupled to receive instruction data from instruction cache 14. Decode unit 18 is further coupled with register file 20, execution unit 22 and MDACU 24 to provide instruction control information to these units. Further, register file 20 is coupled with execution unit 22 for providing data for execution. Similarly, MDACU 24 is coupled with execution unit 22 enabling access to memory data. In addition, MDACU 24 is coupled with data cache 16.

Generally speaking, instructions are fetched from main memory and stored in instruction cache 14 through BIU 12. During execution, instructions are fetched from the instruction cache 14 and decoded by the decode unit 18 which drives the execution unit 22 to execute the decoded instruction/instructions. Execution unit 22 gets the operand data for execution from either register file 20 and/or data cache 16 through MDACU 24. Results generated from execution unit 22 are written back to register file 20 and/or data cache 16 through MDACU 24 via a set of signals, Result 25.

Traditionally, each of these units described above constitutes one or more pipeline stages in a processor. If an instruction (e.g., I1) is fetched from instruction cache 14 during a clock (say C1), during the next clock cycle (say C2), instruction I1 will be in the decode unit 14 while the next instruction (say I2) is being fetched from the instruction cache 14. Thus pipelining enables simultaneous operation of multiple instructions. In general, number of pipeline stages increases with the design complexity and the clock frequency. The term clock frequency refers to number of clock cycles within a time unit, usually a second.

In FIG. 1, the processor 10 is shown with secure-local-clocks generated in each unit. Each unit has a secure clock unit 40 associated with it. Secure-local-clocks (shown in FIG. 1 with postscript 'a' such as 12a) of each unit is synchronized with its neighbors. BIU 12 is synchronized with PLL 26 and external clock 30 through an internal clock 34a. It is also synchronized with instruction cache 14 and data cache 16 through secure-local-clock 12a. Instruction cache is synchronized with its neighbors, BIU 12 through secure-local-clock 12a and decode unit 18 through secure-local-clock 14a. Similarly, data cache 16 is synchronized with BIU 12 through secure-local-clock 12a and MDACU 24 via secure-local-clock 16a. Decode unit 18 is synchronized with instruction cache 14 via secure-local-clock 14a as well as register file 20, execution unit 22, and MDACU 24 through secure-local-clocks 18a. Register file 20 in turn is synchronized to decode unit 18 and execution unit 22. Execution unit 22 is synchronized with decode unit 18, register file 20 through secure-local-clock 18a, and MDACU 24 through secure-local-clock 24a while MDACU 24 is itself synchronized to data cache 16 through secure-local-clock 16a and execution unit 22 via secure-local-clock 24a.

Figure 2:
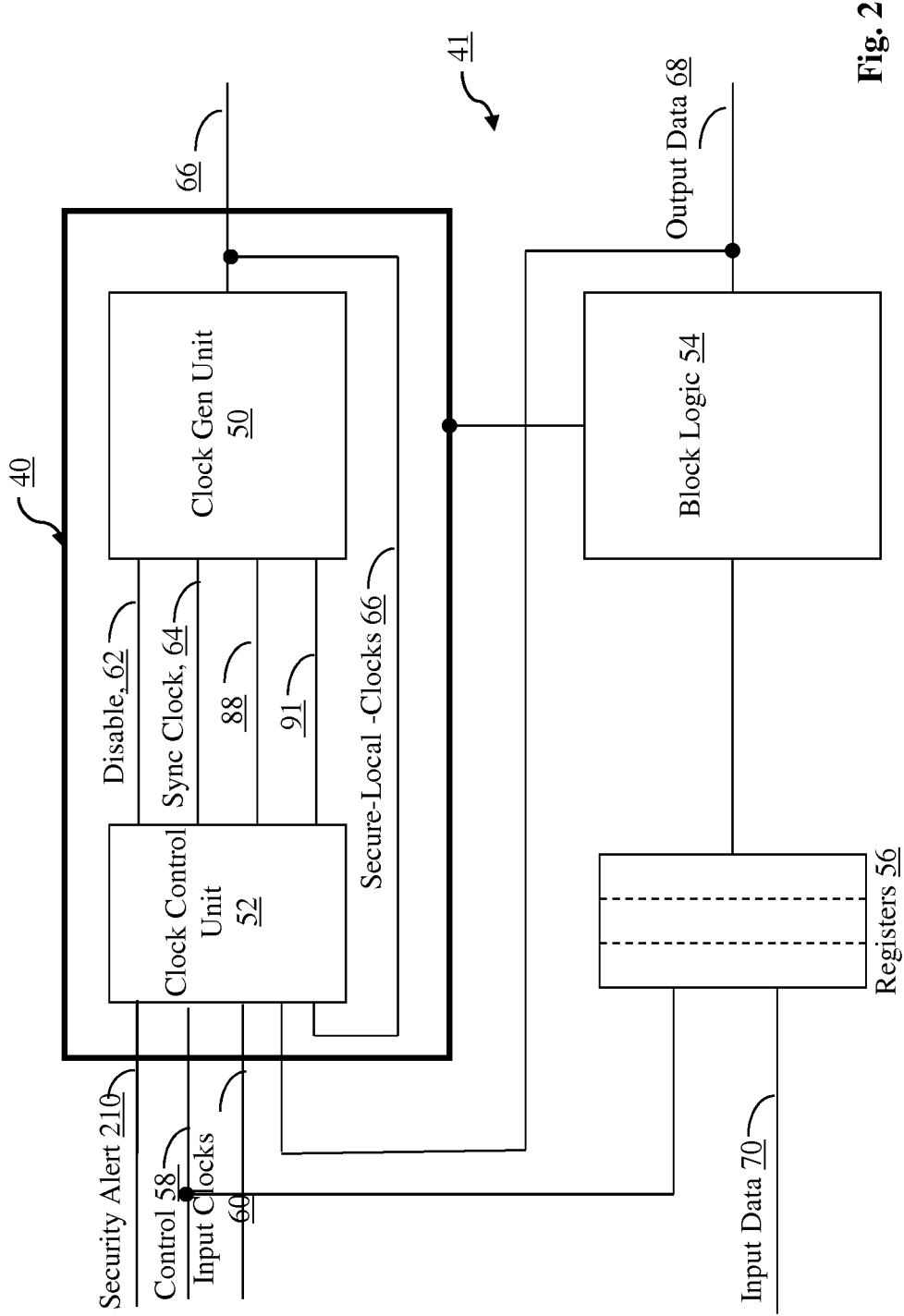
FIG. 2 is a block diagram of one embodiment of the mechanism to generate secure-local-clocks in accordance with this invention.

FIG. 2 shows one embodiment of a secure clock unit 40 located in any of the functional units, BIU 12, instruction cache 14, data cache 16, decode 18, register file 20, execution unit 22 or MDACU 24. In FIG. 2, a functional unit 41 is shown which represents any one of the units in the processor 10. Registers 56 represent the pipeline registers or queue buffers used to isolate the unit that it is associated with from other units. Block logic 54 represents the logic performing the function of functional unit 41. Input data 70 feeds registers 56, while block logic 54 generates output data 68. In one embodiment, the unit may not comprise of Registers 56. In another embodiment, Register 56 may be a single register. In yet another embodiment, Register 56 may be multiple registers. In another embodiment, Register 56 may represent multiple registers configured as a First-In-First-Out (FIFO).

In one embodiment, secure clock unit 40 consists of a clock generation unit 50 and a clock control unit 52. Clock generation unit 50 generates secure-local-clocks 66 for internal use as well as for synchronization with its neighbors. Clock control unit 52 controls the operation of clock generation unit 50. Clock control unit 52 generates a disable 62 to disable generation of secure-local-clocks 66. Also, it selects one or more synchronization clocks 64 to provide synchronization reference to secure-local-clocks 66. In addition, clock control unit 52 generates control information such as a clock-period-selector 91 and a pulse-width-selector 88. Clock control unit 52 generates disable 62 based on the control information on control signals 58 and/or Security Alert 210. It enables synchronization clocks 64 from input clocks 60 (from neighboring units) and secure-local-clocks 66. For instance, the input clocks 60 of the secure clock unit 40 in BIU 12 are clock 34 from the PLL 26, secure-local-clock from instruction cache 14, and secure-local-clock from data cache 16. In one embodiment, secure-local-clocks 66 of BIU can be synchronized to PLL 26, instruction cache 14, data cache 16 or to its own secure-local-clocks 66. Control signals 58 consist of various control parameters like power savings settings. In accordance with this invention, clock control unit 52 may also receive a Security Alert 210 that signals that there is a potential security breach. In one embodiment, Security Alert 210 maybe used by clock control unit 52 to stop the generation of clocks to one or more part of the block logic 54 by asserting disable 62. In another embodiment, this Security Alert 210 may be used to slow down the operation of one or more block logic 54 by generating various values for clock-period-selector 91 and a pulse-width-selector 88.

Figure 3A:
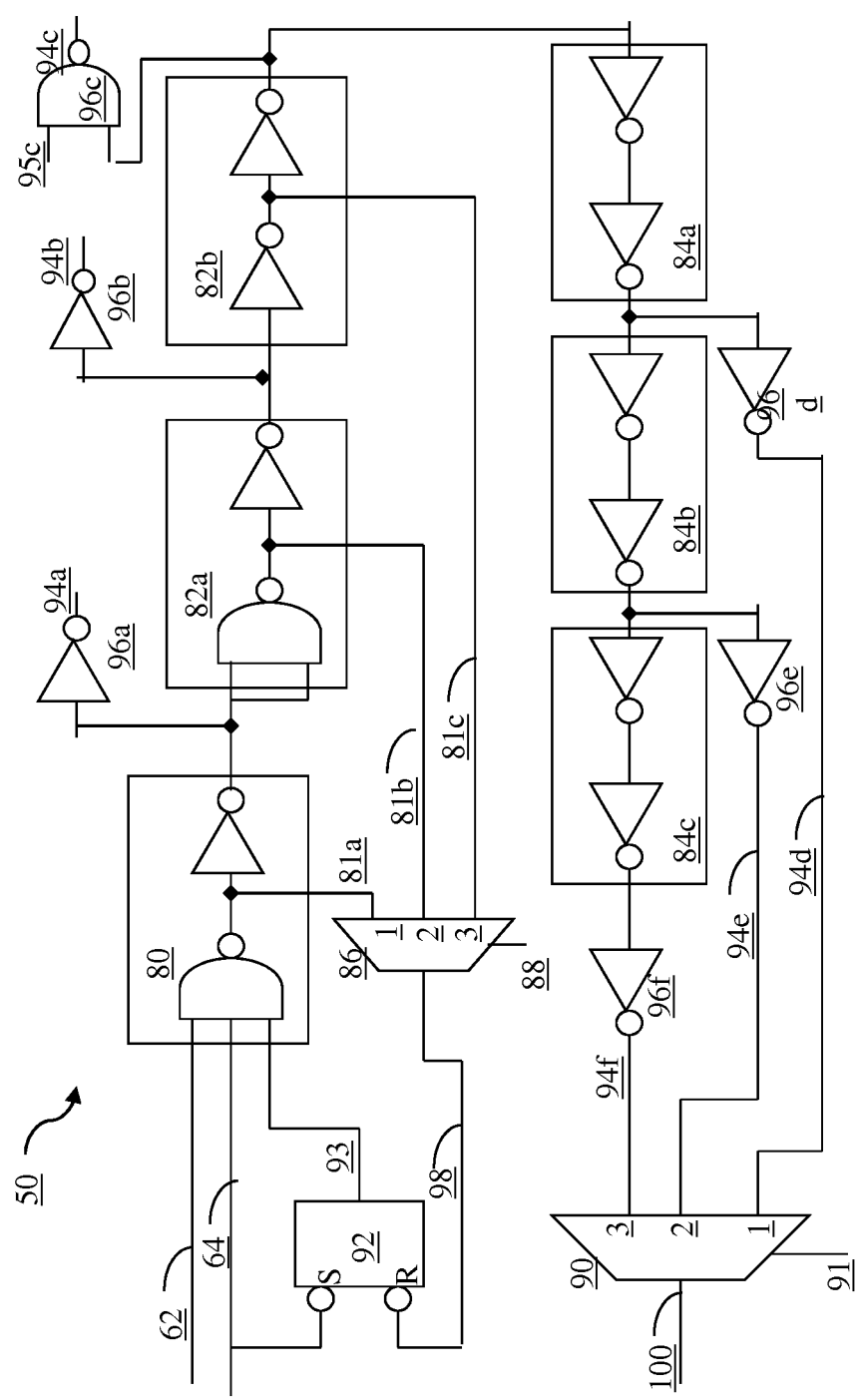
FIG. 3a is a schematic depicting one embodiment of the mechanism to generate secure-local-clocks in accordance with this invention.

Referring now to FIG. 3a, schematic diagram of one embodiment of a distributed, multi-pulse, clock generation unit 50 is shown. It comprises of a clock-generation-pair 80, pulse-width-pairs 82a and 82b, clock-period-pairs 84a, 84b, and 84c, a pulse-width-selector 86, a clock-period-control 90, multi-pulse-taps 96a, 96b, 96c, 96d, and 96f, and a pulse-control-latch 92. Elements referred to herein with a particular reference number followed by a letter will be collectively referred to by the reference number alone. For example, multi-pulse-taps 96a through 96f will be collectively referred to as multi-pulse-taps 96.

Disable 62 and synchronization clocks 64 from clock control unit 52 (in FIG. 2) feed into clock-generation-pair 80 along with a pulse-hold 93. A pulse-reset 98 will deactivate pulse-hold 93. Secure-local-clock pulses 94a, 94b, 94c, 94d, and 94f represent pulses generated at different phases. These pulses can be conditionally enabled by enable signals such as a pulse-enable 95c. In one embodiment, pulse-enable 95c will be generated (not shown) by clock control unit 52.

In one embodiment, clock-generation-pair 80 comprises of a NAND gate followed by an inverter. Similarly, in one embodiment, pulse-width-pair 82 comprises of a pair of inverter depicted by pulse-width-pair 82b or a NAND gate followed by an inverter depicted by pulse-width-pair 82a. In one embodiment, clock-period-pair 84 comprise of a pair of inverters. It should be noted that the various combinations of gates could be used in different embodiments of clock-generation-pair 80, pulse-width-pair 82, and clock-period-pair 84. Number of pulse-width-pair 82 and clock-period-pair 84 present in an embodiment dictates the pulse width and clock period parameters of the generated clocks.

To better understand the operation of clock generation unit 50 depicted in FIG. 3a, the negative clock pulses generated by clock generation unit 50 are depicted in the timing diagram FIG. 3b. Following explanations refer to both FIG. 3a and FIG. 3b. However, for the sake of clarity, any reference to FIG. 3b will be explicitly stated. During initialization, disable 62 (depicted as active low in FIG. 3b) is asserted. This disables generation of secure-local-clock pulse signals 94. They remain high or inactive.

When clock control unit 52 (of FIG. 2) determines that a clock need to be generated by clock generation unit 50, it de-asserts disable 62 and enables a pulse on synchronization clocks 64. Negative edge transition of synchronization clocks 64 (shown as 100a in FIG. 3b) causes pulse-control-latch 92 to transition pulse-hold 93 to logic high level. When synchronization clocks 64 transitions to high level (shown as 100b in FIG. 3b) it causes all signals at the input of NAND gate of clock-generation-pair 80 (disable 64, synchronization clocks 64, and pulse-hold 93) to high level. This drives the output of NAND gate of clock-generation-pair 80 to a low level. This in turn forces the inverter of clock-generation-pair 80 to high level causing secure-local-clock pulse 94a to go low. This transition is shown in FIG. 3b as 94a-1. The transition travels through pulse-width-pair 82 and clock-period-pair 84 and is depicted in FIG. 3b for secure-local-clock pulse 94. Clock-generation-pair 80, pulse-width-pair 82, and clock-period-pair 84 together can be envisioned as a delay chain through which any transition on NAND gate of clock-generation-pair 80 will traverse. In one embodiment, secure-local-clock pulse 94f is selected as output clock 100 and its transitions are shown at 100c and 100d. It should be noted that output clock 100 along with secure-local-clock pulses 94 constitute secure-local-clocks 66 depicted in FIG. 2.

Depending on the value of pulse-width-selector 88 (value is one in FIG. 3b), pulse-control-latch 92 will reset when the transition reaches 98. This causes pulse-hold 93 to go low and thus forcing NAND gate of clock-generation-pair 80 to go high. This results in second transition of levels following the first one depicted as 94a-2 in FIG. 3b. This transition is also transmitted across pulse-width-pair 82 and clock-period-pair 84 shown in FIG. 3b for secure-local-clock pulses 94. After the second transition, pulse-hold 93 will hold the circuit in this state until new synchronization clocks 64 restarts the process. This guarantees that only one pulse will be generated in a clock period. In one embodiment, conditional gate such as multi-pulse-tap 96c may be used instead of an inverting buffer such as multi-pulse-tap 96a. This enables some of the pulses to be conditionally generated by using a gating function such as pulse-enable 95c. When pulse-enable 95c is not active, there will be no pulse on secure-local-clock pulse 94c as shown by 94c-1 in FIG. 3b. This is one mechanism of introducing control information to clock signals.

The pulse width of secure-local-clocks varies depending on the value of pulse-width-selector 88. The value on pulse-width-selector 88 selects one of the signals signal 81a, signal 81b, or signal 81c through pulse-width-selector 86 as pulse-reset signal 98. In one embodiment, pulse-width-selector 88 can have value ranging from one to three, as the clock generation unit 50 comprises of one clock-generation-pair 80 and two pulse-width-pair 82. Maximum value of pulse-width-selector 88 depends on number of pulse-width-pair 82 present in any embodiment. In FIG. 3b, positive transition occurs at 94a-2 when pulse-width-selector 88 is one, at 94a-3 if pulse-width-selector 88 is two, and at 94a-4 if pulse-width-selector 88 is three. Similarly, the value of clock-period-selector 91 determines the clock period. In one embodiment, clock-period-selector 91 can vary from one to three based on three clock-period-pair 84 (of FIG. 3a). Maximum value of clock-period-selector 91 depends on number of clock-period-pair 84 (or number of pulse-width-pair 82 and clock-period-pair 84) in any given embodiment. The pulse edges of secure-local-clock pulses 94 depend on the delay through the dealt pairs. For instance, depending on the propagation delay across clock-generation-pair 80, the negative transition of pulse 94b can be at 94b-1 or 94b-2. Similarly, the positive transition can be as 94b-3 or 94b-4.

Delay chain of clock-generation-pair 80, pulse-width-pair 82, and clock-period-pair 84 along with clock-period-control 90 determines the clock period of 100. Since clock-generation-pair 80, pulse-width-pair 82, and clock-period-pair 84 are all active elements in the design they are equally susceptible to any changes in the process technology as other active elements in the design. In one embodiment, gates in clock-generation-pair 80, pulse-width-pair 82, and clock-period-pair 84 can be chosen to closely reflect the gates in the logic path of the unit resulting in a scalable design with process technology.

The clock generation unit 50 will continue to generate secure-local-clocks 66 as long as the Security Alert 210 is not asserted and the control signals 58 are enabled. In accordance to this invention, when there is a potential security breach condition and Security Alert 210 is asserted, one or more secure-local-clocks may be disabled. In one embodiment, one or more secure-local-clocks could change their operating parameters of frequency and/or pulse width.

Referring now to FIG. 3c, timing diagram of multiple clock cycles with varying clock periods are depicted. In one embodiment, during the first clock cycle, clock-period-selector 91 has a value of 3 resulting in secure-local-clock pulse 94f being selected as output clock 100 through clock-period-control 90. Clock period here is from 100a to 100c. During the next clock cycle, clock-period-selector 91 has a value of 1 thus selecting secure-local-clock pulse 94d through clock-period-control 90 as output clock 100. Clock period here is between 100c and 100e. Thus, the clock period of the output clock can be varied dynamically.

It should be noted that in an embodiment, positive pulses (instead of negative pulses) can be generated from the same circuit such as clock generation unit 50 by tapping the pulses before the inverter of clock-generation-pair 80, pulse-widthpair 82, and clock-period-pair 84. In another embodiment both positive and negative pulses can be tapped. When positive or negative pulses are tapped, the granularity at which the clock period can be varied is two gates. When both positive and negative pulses are tapped, this granularity is one gate. Also, in this case, the pulses with one gate delay phase difference can be generated.

In another embodiment, clock-generation-pair 80 can be followed by couple of buffers. The clock period in this case can be adjusted by varying the size of the transistors forming the buffers. Further embodiments can include some combinations of delay pairs (pulse-width-pair 82 and clock-period-pair 84) and buffers.

Figure 4:
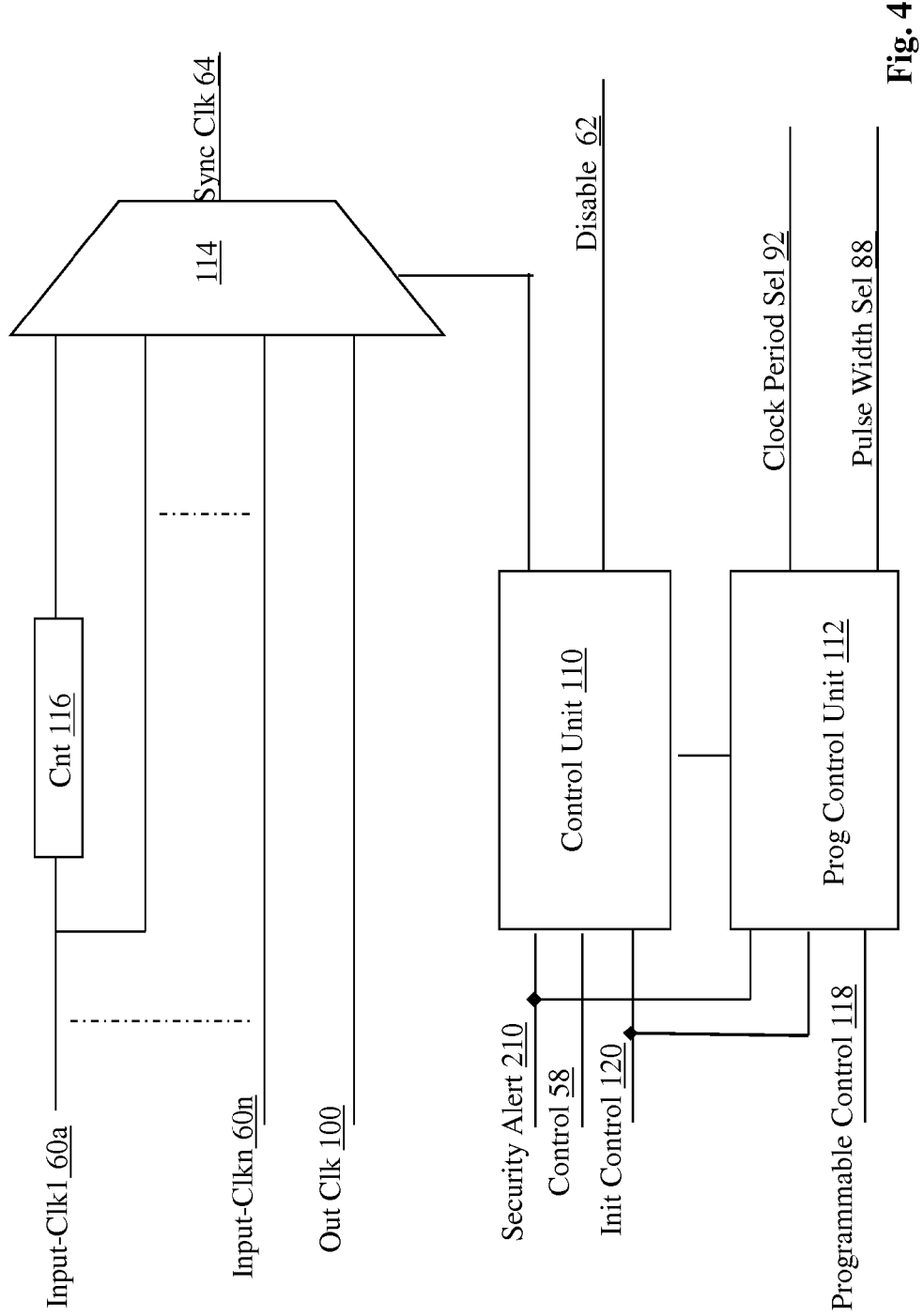
FIG. 4 is a block diagram of one embodiment of secure-local-clock control unit.

Referring next to FIG. 4, a block diagram one embodiment of clock control unit 52 (of FIG. 2) is depicted. It comprises of a control unit 110, a program control unit 112, a synchronization clock selector 114, and control counter 116. Input-clock 60a through 60n represent output clocks 100 from neighboring units that need to synchronize with the unit under consideration. In one embodiment, one or more of input clocks 60 can represent combination of plurality of secure-local-clocks from same or different functional units. The output clock 100 (depicted as part of secure-local-clocks 66 in FIG. 2) is also used as one of the input to synchronization clocks 64. While a control 58 controls the normal operation of secure clock unit 40 (FIG. 2), initialization control 120 dictates its operation during initialization and synchronization. Security Alert 210 enables security of the unit by controlling both normal and initialization/synchronization operations.

In one embodiment, secure-local-clocks 66 from neighboring units may be used instead of output clock 100 as an input into synchronization clock selector 114.

In one embodiment, during initialization (enabled by assertion of 120) when there are no security threats, control unit 110 activates disable 62 and enables program control unit 112 to program initial values for clock-period-selector 91 and pulse-width-selector 88 based on programmable control 118. Control unit 110 then deactivates disable 62 and selects one of input clock 60 as synchronization clocks 64. Program control unit 112 then adjusts clock-period-selector 91, if required, to synchronize with synchronization clocks 64. This fine-tuning may be needed to account for loading and routing delay that will be different for different secure-local-clocks. This fine-tuning of clock-period-selector 91 enable synchronization of secure-local-clocks 66 with neighboring clocks accounting for dynamic capacitive loading and routing delays. At the completion of initialization, secure clock unit 40 enters normal operation mode.

In normal operation mode, disable 62 is de-activated when secure clock unit 40 (FIG. 2) needs to generate clocks. Disable 62 is generated by control unit 110 based on control information on control signals 58 and Security Alert 210. Thus, Security Alert 210 introduces security control information to secure-local-clocks 66. Synchronization clock selector 114 selects synchronization clocks 64 based on the condition that is requiring the clock. For instance, if the functional unit associated with input clock 60a has sent data to functional unit 41 requiring action from functional unit 41, than input clock 60a is selected as synchronization clocks 64. Once functional unit 41 has started generating clocks, it can use either its own output clock 100 or any other input clock 60 in continuing to generate secure-local-clocks 66.

In one embodiment, input clock 60 can represent combination of multiple clocks. For instance, when multiple functional units are driving a functional unit simultaneously, it might be desirable to synchronize the secure-local-clocks of the unit with the input clock arriving last at clock-generation-pair 80. In this case, all input clocks will feed an AND gate (not shown) and the output of that AND gate will be one of the synchronization clocks. If synchronization with the first arriving clock is desired, an OR gate can be used instead of the AND gate mentioned above. It should be noted that in one embodiment, it is possible to generate multiple synchronization clocks 64 and use a wider gate at clock-generation-pair 80 to generate the necessary combination function.

In one embodiment, when synchronizing with combination of multiple input clocks or different clocks from different unit, it might be necessary to adjust the clock period of secure-local-clocks 66 accordingly. Program control unit 112, in this case can generate appropriate clock-period-selector 91 along with synchronization clocks 64. This feature can effectively account for varying propagation delay between various units.

It should be noted that during normal operation of control unit 110, control counter 116, program control unit 112, and other clock control functions are evaluated when input clock goes to logic low level. As the clock period is timed with the raising edge of the clock in this embodiment, all clock control function evaluation latency is transparent to clock generation logic. Clock generation does not incur any clock control function evaluation penalty as seen in traditional gated clock systems.

The generation of secure-local-clocks 66 can stop if there is a stall. Stall is a condition that blocks the flow of instructions through the pipe. For instance, if data cache 16 (of FIG. 1) does not have the requested data, it needs to fetch it from the main memory (which will take longer time). In this situation, data cache 16 informs requesting functional unit to wait until the data is available. This is a stall condition. If the MDASU 24 was requesting the data, then secure clock unit 40 associated with MDASU 24 will stop generating secure-local-clocks 66. Generation of secure-local-clocks 66 in MDASU resumes with the arrival of input clock 60 from data cache 16. It should be noted that there are various types of stalls and the operation described above can be used for any such conditions. Security breach could be a condition where a potential illegal operation is executed by the device, or an unauthorized person is trying to access, or any such conditions.

In one embodiment, if the clock period of input clock 60 and that of output clock 100 are not equal, synchronization with such clock will happen in multiple of clock cycles instead of every cycle. For instance, if input clock 60a is selected and it is running at twice the clock period of output clock 100, then synchronization with input clock 60a happens once every two output clock 100. Every input clock 60 that runs at different clock period than output clock 100, has control counter 116 associated with it to assist in this type of synchronization. It is to be noted that with this mechanism, clocks of any period can be synchronized. For instance, if the output clock 100 is running at ⅔ clock period of input clock 60a, than synchronization happens for every 2 clock cycles input clock 60a and 3 clock cycles of output clock 100.

Clock period of output clock 100 can be varied to match the clock period of input clock 60. In this case, functional unit 41 will have varying clock period based the function it is required to perform. This is another example of embedding functionality into the clock control.

In one embodiment, each input clock 60 has control information associated with it that is part of control signals 58. This allows clock control unit 52 to generate secure-local-clocks 66 based on the functionality. This exemplifies another method of introducing control information to secure-local-clocks 66.

Figure 5:
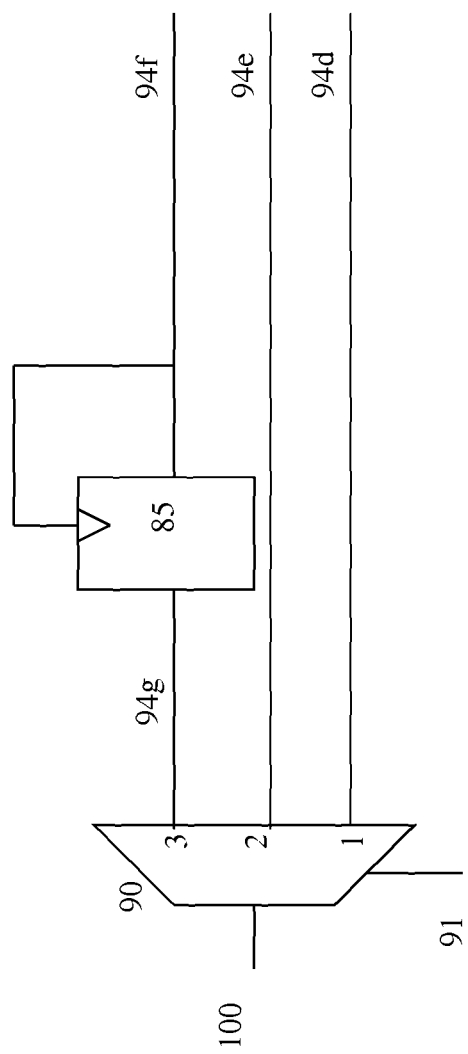
FIG. 5 is a block diagram of one embodiment of the mechanism to vary the clock frequency.

Above explained apparatus and methods enable a digital design to execute at highest frequency possible based on the design and technology. It might be desirable to run the design at much lower frequency due to system issues or power issues. FIG. 5 depicts a simple mechanism to achieve this. FIG. 5 depicts the clock period selection logic of FIG. 3a. It depicts secure-local-clock pulses 94d through 94f being selected by clock-period-control 90 based on the value on signal clock-period-selector 91. In addition, FIG. 5 depicts a frequency divider 85 inserted to the path of secure-local-clock pulse 94f. The count value of frequency divider 85 is programmable. Frequency divider 85 counts the number of pulses on 94f and generates a pulse on signal 94g when the number of pulses on 94f equals the programmed count value (say N). This results in output clock 100 having pulse ones every N pulses on 94f.

Referring to FIG. 4, generation of secure-local-clocks 66 can stop if there is a security breach. A potential security breach may be detected resulting in activation of Security Alert 210. This will result in blocking of the generation of secure-local-clocks 66. There are several ways a potential security breach may be detected. Several embodiments of detection are described below. It should be noted that this invention would apply equally well to any form of security breach detection.

Figure 6:
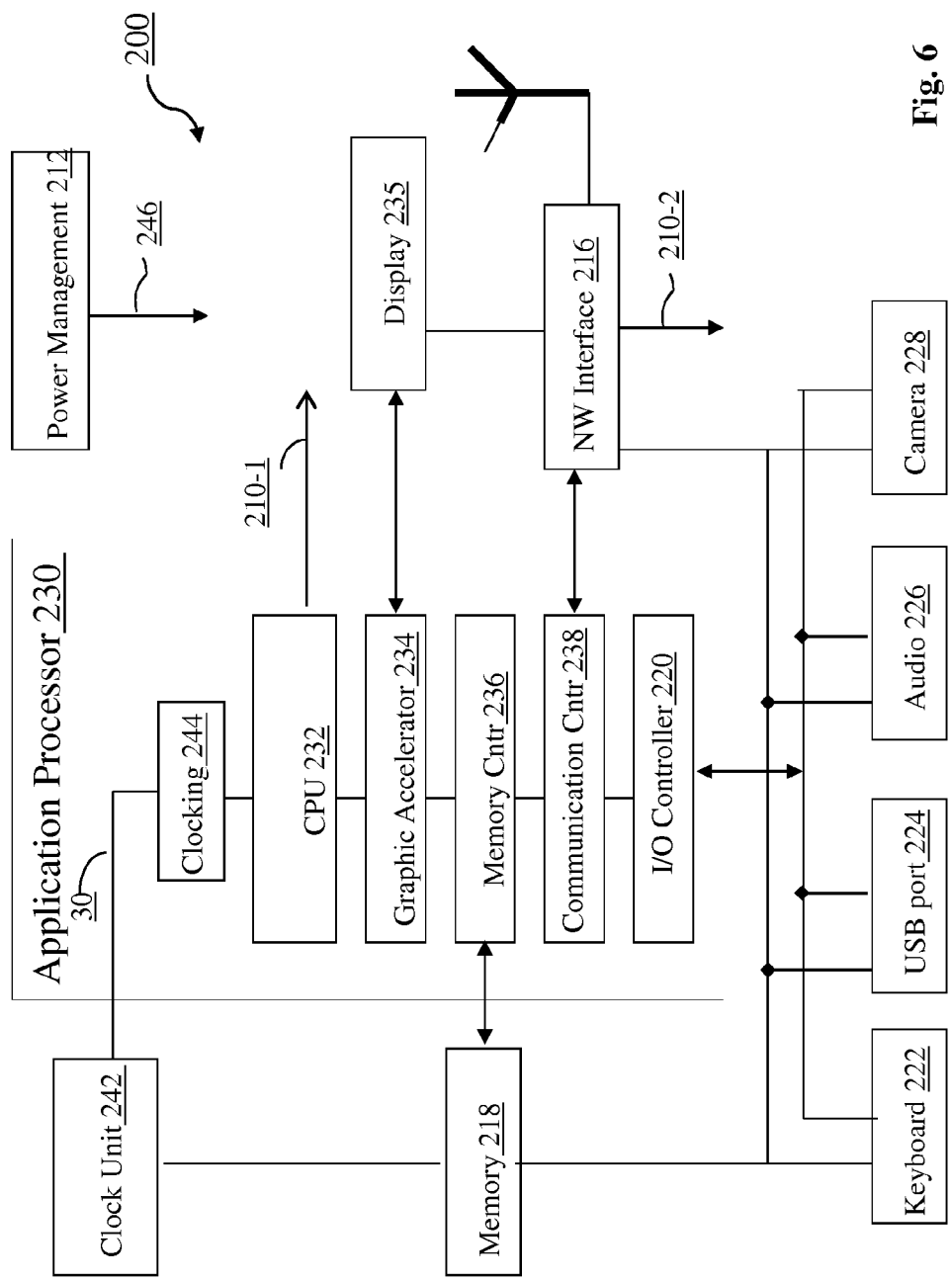
FIG. 6 is a block diagram of one embodiment of a Mobile Device configured in accordance with this invention.

Turning now to FIG. 6, a block diagram of an embodiment of a Mobile Device 200 is shown. A sample embodiment is depicted with several functional units to assist in the description of the present invention. The invention applies equally well to all embodiments of Mobile Devices. It should be noted that while a portable device is shown as an example in the description of the invention, embodiments of the present invention may be utilized in any synchronous digital designs such as processors, computer systems, multi-processor systems, memory devices, networking devices, and cell phones.

As shown in FIG. 6, Mobile Device 200 may include several functional units such as an Application Processor 230, a Power Management Unit 212, a Display 235, a Network Interface 216, a Memory 218, a Keyboard/Touchscreen 222, a USB port 224, an Audio device 226, a Camera 228, and a Clock Unit 242. Clock Unit 242 connects all units in Mobile Device 200 via a Clock 30. It should be noted that Clock 30 could be same frequency clock going to all devices or different frequency clocks and/or different phase clocks. Clock 30 controlling the Mobile Device 200 maybe used by one or more units as synchronization mechanism to communicate with other units within the Mobile Device 200. One or more units may further generate secure-local-clocks for controlling the operation.

Application Processor 230 may include functional units such as a CPU 232, a Graphic Accelerator 234, a Memory Controller 236, a Communication Controller 238, an I/O Controller 220, and a Clocking Unit 244. In accordance with this invention, one or more of these unit maybe designed with secure-local-clocks. In one embodiment, CPU 232 may be the processor 10 described in FIG. 6 configured with distributed secure-local-clocks in accordance with this invention. In another embodiment, the Graphic Accelerator 234 may be similar to processor 10 configured with distributed secure-local-clocks. In another embodiment, Memory Controller 236 or Communication Controller 238 or I/O Controller 220 may be configured with secure-local-clocks.

Application Processors 230 of Mobile Device 200 performs most of the operations. CPU 232 is the core of Mobile Device 200. Graphic Accelerator 234 is used in high-performance Mobile Device to provide high quality graphic display, including video. Memory Controller 236 controls the operation of Memory 218. Memory 218 typically include of hard drive, SDRAM, DDR, DRAM, Flash RAM, and other forms of memory devices. Communication Controller 238 enables Mobile Device 200 to interface with external world via Network Interface 216. Network Interface 216 enables Mobile Device 200 to communicate via various network media, both wired and wireless are like Ethernet, Bluetooth, GPS, GSM modem, Wi-Fi, WiMAX and others.

I/O Controller 220 of the Application Processor 230 enables Mobile Device 200 to connect to various I/O Devices. I/O Device Keyboard/Touchscreen Device 222 allows users to either type or touchscreen the data. I/O Device USB port 224 allows various USB devices to be connected to Mobile Device 200. I/O Device Audio device 226 provides audio interface to Mobile Device 200 such as microphones, speakers etc. I/O Device Camera 228 captures pictures for Mobile Device 200.

In one embodiment, one or more units of Mobile device 200 may be configured with secure-local-clocks. In one embodiment, Application Processor may be configured with secure-local-clocks 66 in accordance with this invention. In another embodiment, Memory 218 or Network Interface 216 may be configured with secure-local-clocks 66. In effect, any or all units of Mobile Device 200 may be configured with secure-local-clocks 66.

Clock Unit 242 controls the synchronization operation of all units within Mobile Device 200 by Clock 30. In one embodiment, Clock 30 can be a derivative clock running at various frequencies. In another embodiment Clock 30 can be a group of clocks each running at different frequencies. In one embodiment, Clock 30 going to Memory 218 can be a low-frequency clock when compared to Clock 30 going to application processor 230. Each Clock 30 going to different units may be synchronized with each other or can be unsynchronized. Power Management 212 provides power to all units. Power Management 212 also controls the operation of each unit by supplying Clock Enable 246.

The Security Alert 210 may be detected by various units within the Mobile Device 200. In one embodiment, as shown in FIG. 6, CPU 232 of Application Processor 230 triggers Security Alert 210-1 signal. In this embodiment, CPU 232 is programmed to detect conditions of potential security breach. It should be noted that any unit within the Mobile Device 200 could detect the security breach. In one embodiment, Graphic Accelerator 234 could detect the security breach. In another embodiment, Network Interface 216 could detect the security breach. In yet another embodiment, the I/O devices could detect the security breach. In accordance with the embodiment, security breach may be detected at any location on the device.

In one embodiment, more than one Security Alert 210 may be generated in a device. In FIG. 6, CPU 232 is shown generating a Security Alert 210-1 and Network Interface 216 generating a Security Alert 210-2. Elements referred to herein with a particular reference number followed by a dash and number will be collectively referred to by the reference number before the dash alone. For example, Security Alert 210-1 and Security Alert 210-2 will be collectively referred to as Security Alert 210.

In one embodiment, Security Alerts 210 generated by a unit within Mobile Device 200 may be used by any other unit to inhibit the generation of security secure-local-clocks 66.

Next, the mechanism of generating Security Alert 210 will be considered. In the description below, Security Alert 210 will be described being generated in CPU 232. It should be noted that in other embodiments, Security Alert 210 could be generated in other units.

Figure 7:
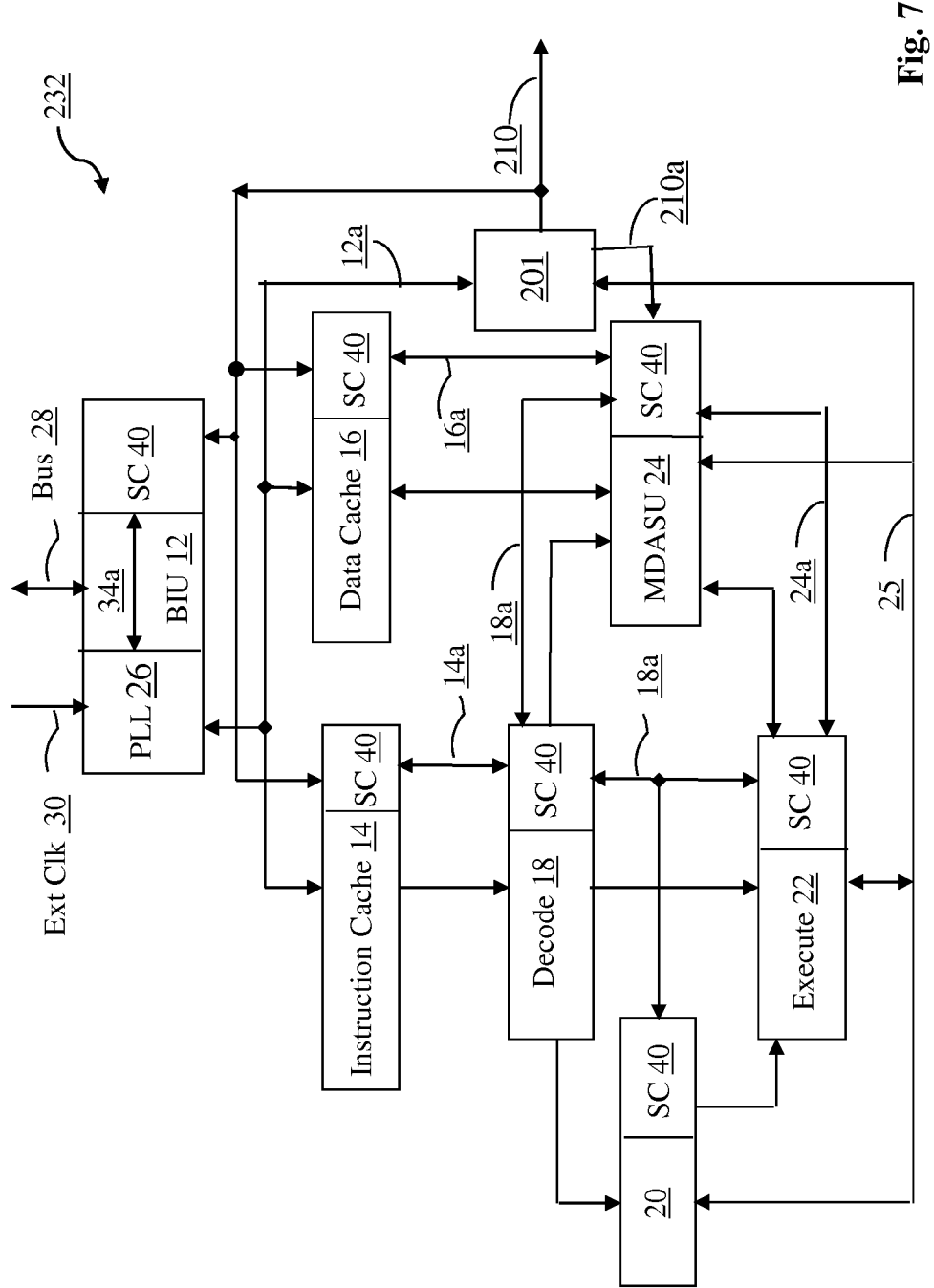
FIG. 7 is a block diagram of one embodiment of a CPU generating security alert.

Referring now to FIG. 7, an embodiment of CPU 232 generating Security Alert 210 is shown. It should be noted that CPU 232 is shown as an embodiment of sample processor 10 shown in FIG. 1 operating with secure-local-clocks.

In FIG. 7, A Security Alert Gen 201 is shown to generate Security Alert 210 signal. Security Alert Gen 201 is shown as a block In FIG. 7. It should be noted that in various embodiments, Security Alert Gen 201 may be implemented as a software program, hardware logic, micro-code segment, or a combination of any of these. In one embodiment, it may be generated as a software program. In another embodiment, it may be generated in hardware. In yet another embodiment it may be an hardware signal.

Security Alert 210 will be used to control the generation of secure-local-clocks 66 by one or more secure clock units 40. In FIG. 7, secure clock units 40 of BIU 12, data cache 16, and instruction cache 14 uses Security Alert 210 to generate respective secure-local-clocks 66. As long as Security Alert Gen unit 201 does not detect any potential security threat, Security Alert 210 will be de-asserted. This will enable clock control units 52 (referring to FIG. 2 and FIG. 4) of BIU 12, data cache 16, and instruction cache 14 to generate the secure-local-clocks 66. When Security Alert Gen unit 201 detects a potential security breach, it will assert Security Alert 210. All clock control units 52 receiving this Security Alert 210 will stop generating respective secure-local-clocks 66 until Security Alert 210 becomes inactive.

In one embodiment, Security Alert Gen 201 may generate more than one Security Alerts. Security Alert Gen 201 of FIG. 7 generates two alters, Security Alert 210 and Security Alert 210a. In one embodiment, different Security Alerts may drive the generation of different secure-local-clocks 66. FIG. 7 shows Security Alert 210 driving secure clock units 40 of BIU 12, data cache 16, and instruction cache 14, while Security Alert 210a drives the secure clock unit 40 of MDASU 24.

In one embodiment, Security Alert 210 may be used to generate secure-local-clocks 66 in CPU 232. In another embodiment, Security Alert 210 may be connected to other units in Mobile Device 200 and used to generate secure-local-clocks 66 in those units. In yet another embodiment, one or more units may use Security Alert 210 to generate secure-local-clocks 66.

Figure 8:
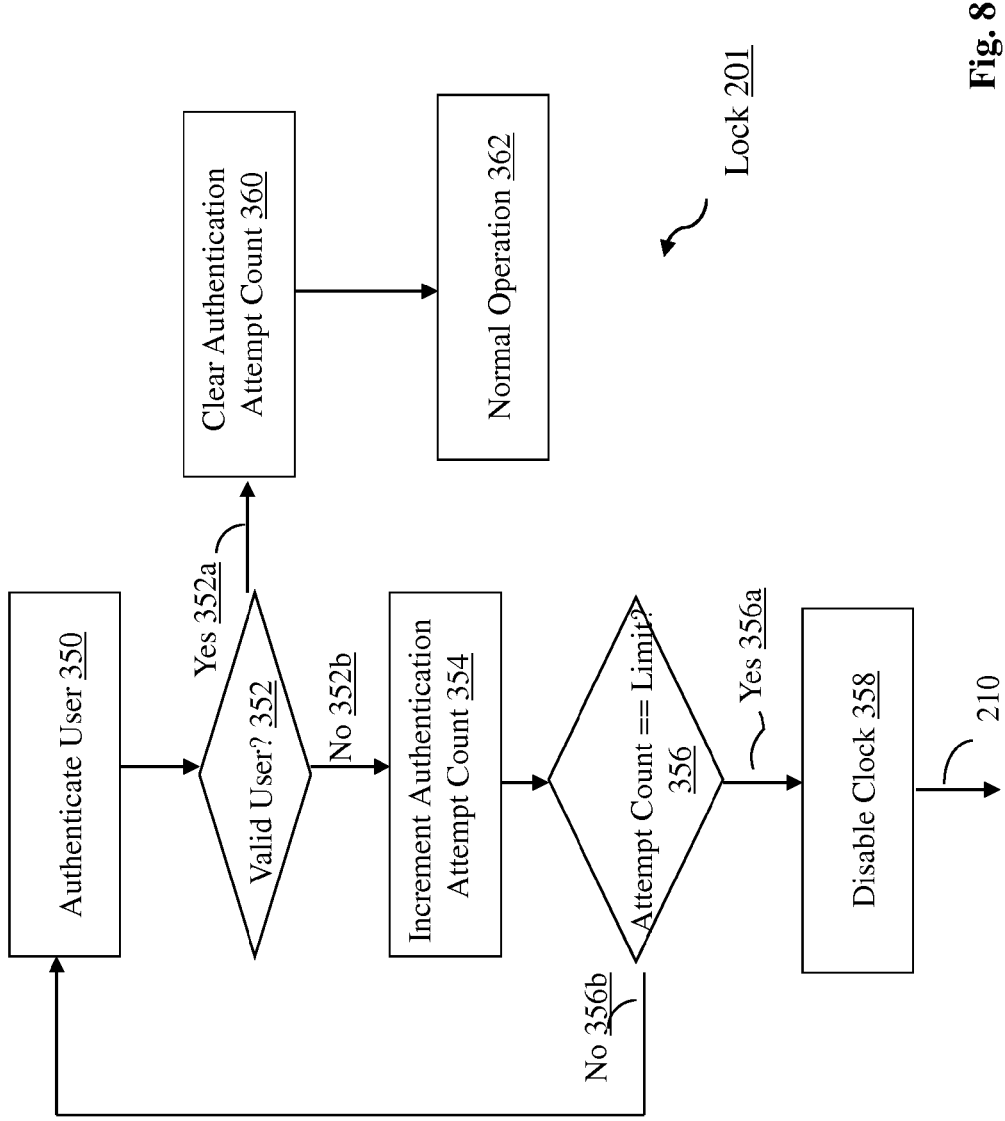
FIG. 8 is a flow chart showing a method for detecting an invalid access attempt and generating security alert.

Turning now to FIG. 8, an embodiment of Security Alert Gen 201 for generating Security Alert 210 is shown. In one embodiment, this can be a hardware block. In another embodiment, this can be a software code segment. In yet another embodiment, Security Alert Gen 201 can be a microcode segment. In yet another embodiment, Security Alert Gen 201 may be implemented as a combination of hardware, software, and/or micro-code.

Many events can trigger Security Alert 210. In one embodiment, events that trigger Security Alert 210 may depend on the application of the device. In one embodiment, an attempt by an invalid user to use the device may trigger Security Alert 210. In another embodiment, a device may be set to trigger a Security Alert 210 if it is used without pre-defined enablers like keys. In yet another embodiment, Security Alert 210 may be triggered based on parameters like geographic locations, time of use, and others. In yet another embodiment, Security Alert 210 may be triggered when attempt to perform illegal operations are detected. In one embodiment, Security Alert 210 may be triggered by access to prohibited applications.

While the generation of Security Alerts 210 for failed user authentication is illustrated in FIG. 8, it should be noted that this invention works for all types of potential security violations.

In FIG. 8, Security Alert Gen 201 has an Authenticate User block 350 that is coupled to a User Valid Checking Block 352. This is coupled to Clear Authentication Attempt Count block 360 and Increment Authentication Attempt Count block 354. Clear Authentication Attempt Count block 360 is coupled to Normal Operations block 362. Increment Authentication Attempt Count block 354 is coupled to Attempt Count Limit checking block 356. This Attempt Count Limit checking block 356 is further coupled to Authenticate User block 350 and Disable Clock block 358. Disable Clock block 358 generates Security Alert 210.

The simple mechanism shown here depicts Authenticate User 350 authenticating the user. Authenticate User 350 will be invoked during the power-up and/or login. In one embodiment, this authentication is invoked at regular intervals to assure the security of the Mobile Device. In another embodiment, authentication is triggered when preset conditions are detected.

Valid User 352 checks if the user is authorized to use the Mobile Device 200. This authentication process may comprise of various methods and mechanisms such as a simple password checking mechanism, hardware port checking mechanism, biometric checking mechanism, or other authentication mechanisms. Biometrics verification includes fingerprint, DNA, face recognition, eye scan etc. If authentication checking passes, (shown by 352a in FIG. 8) Clear Authentication Attempt Count 360 will clear the authentication attempt count and send the operational flow to Normal Operations 363. If the authentication fails as shown by 352b, Increment Authentication Attempt Count 354 will increment the attempts count and send the operation flow to checking the attempt count in Attempt Count Limit checking block 356. If the authentication attempt has not exceeded the preset limit, the flow will be sent to retrying the authentication process in Authenticate User 350 as shown by 356b. Authentication process will be repeated until the limit is reached. When the preset attempt count is equaled or exceeded, as shown by 356a, Security Alert 210 will be asserted by Disable Clock 358.

In one embodiment, the authentication limit could be set to one. In this case Mobile Device 200 will lockup when the authentication fails the very first time. This may be required in an extremely security conscious application. In one embodiment, the authentication limit maybe made programmable to be set based on the security requirements of each deployment.

In one embodiment, Security Alert 210 may be used to disable clocks of the unit detecting the security breach attempt. In another embodiment, Security Alert 210 may be used to disable clocks of other units in Mobile Device 200. In this case, Security Alert 210 can be generated as an interrupt. The interrupt signal could be connected to secure-local-clock generation units of other units in Mobile Device 200.

Figure 9:
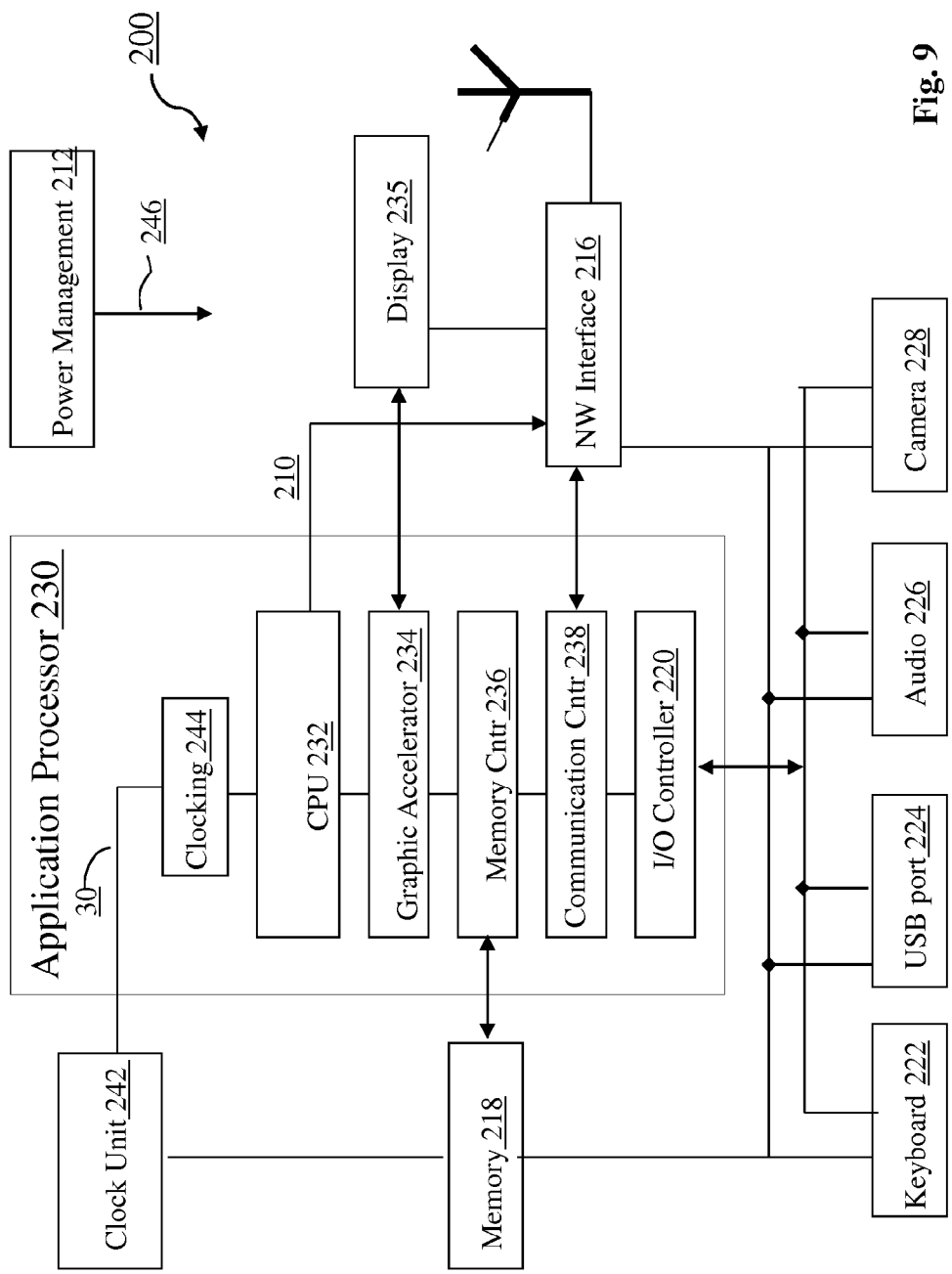
FIG. 9 is a block diagram of a Mobile Device generating security alert.

Turning now to FIG. 9, an embodiment of Mobile Device 200 with CPU 232 generating Security Alert 210 is shown. In this embodiment, Security Alert 210 feeds into Network Interface 216. This will disable the generation of secure-local-clock 66 in Network Interface 216.

In other embodiments, Security Alert 210 may interrupt the generation of secure-local-clocks of other units of the Mobile Device 200 such as Memory 218, Display 235, etc.

In some cases, it may be beneficial to return Mobile Device 200 to its normal operational state when the security breach situation is resolved. Next, a mechanism to resolve Security Alert in devices is described. While the description depicts a simple means to reactivating the device, the invention applies to all mechanisms.

Figure 10:
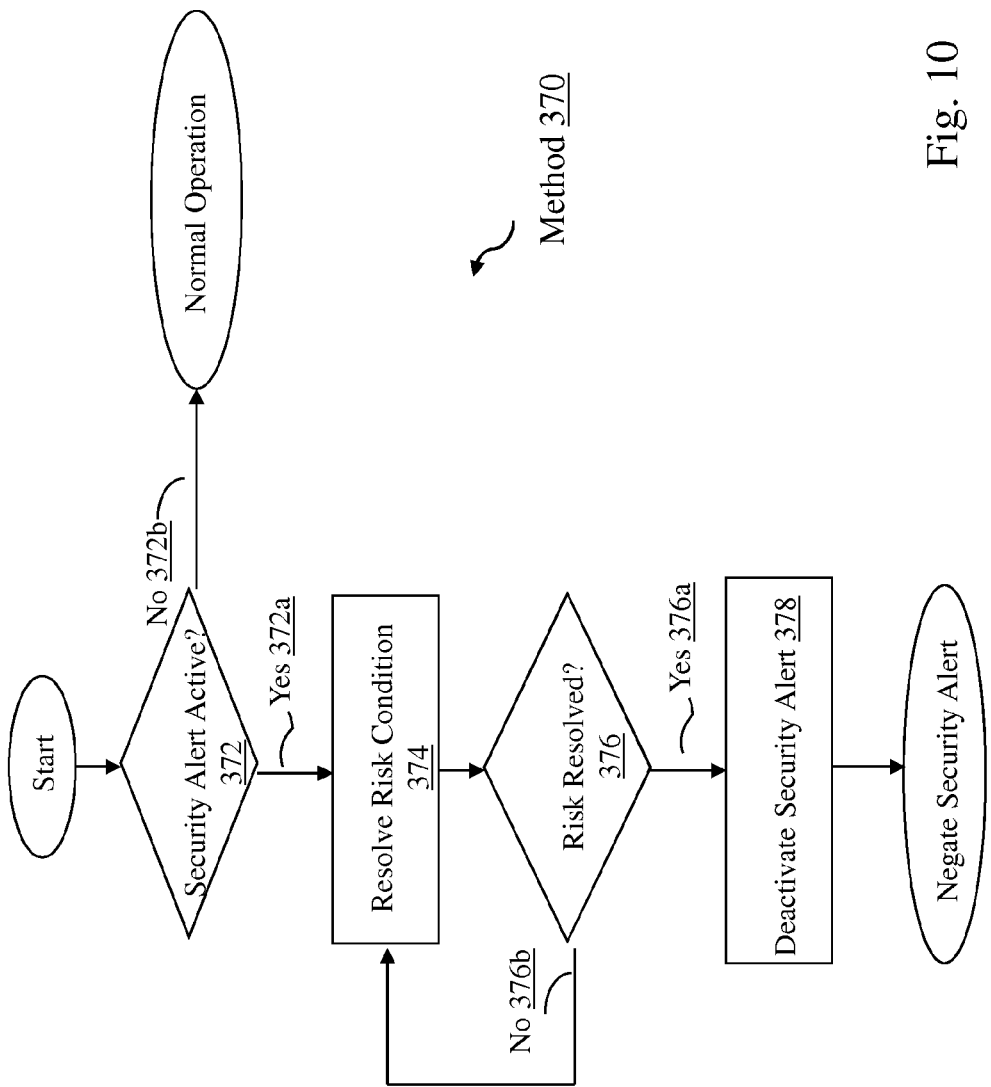
FIG. 10 is a flow chart showing a method for deactivating a security alert.

Turning to FIG. 10, a Method 370, for deactivating the Security Alert if and after the security risk situation is resolved is shown. In Method 370, security breach mechanism is resolved by CPU 232 by deactivating the Security Alert 210. Method 370 can be implemented in hardware, software, or micro-code. The method comprises of a Security Alert Active 372, a Resolve Risk Condition 374, a Risk Resolved block 376, and a Deactivate Security Alert 378. Security Alert Active 372 tests if a lock condition is asserted. If it is not asserted, Mobile Device 200 will continue to perform normal operations as shown by 372b. When Security Alert Active 372 detects a Security Alert condition, the operation flows to Resolve Risk Condition 374 as shown by 372a. Risk Resolved 376 waits for the security breach to be resolved as shown by 376b. If and when the condition is resolved, the flow moves to Deactivate Security Alert 378 as shown by 376a. This will deactivate the Security Alert 210 signal. When Security Alert 210 is deactivated by the CPU, it will re-enable the blocked modules like Network Interface 216.

It should be noted that to utilize this method of reactivating, the portion evaluating the deactivate condition may not be locked. Referring to FIG. 7, CPU 232 may be implemented in such a manner that the Security Alert 210 is asserted, but not Security Alert 210a. This will allow for CPU 232 to execute Method 370 to deactivate Security Alert 210. But, as the generation of secure-local-clocks of BIU 12, instruction cache 14, and data cache 16 are blocked, CPU 232 will in effect be locked in response to potential security breach. Yet, it may be setup to evaluate the security breach resolve condition.

While Method 370 of FIG. 10 shows one mechanism to resolve the Security Alert situation in a CPU, Mobile Device 200 may be reactivated in several ways. In one embodiment, Mobile Device 200 can be reactivated remotely by invoking a preset program within the CPU. In another embodiment, Mobile Device 200 can be reactivated by running a preset program via a command through the keyboard. In yet another embodiment, Mobile Device 200 can be reactivated following a hardware reset.

As can be seen, there are various ways of locking and unlocking Mobile Device 200 by using blocking the generation of secure-local-clocks 66. The embodiments described in the figures are illustrative for demonstrating the workings of the mechanism. It is not limiting the possible implementation of various embodiments.

While the above description contains many specificities, these should not be construed as limitations on the scope of the invention, but rather as an exemplification of preferred embodiments thereof. Accordingly, the scope of the invention should be determined not by the embodiment(s) illustrated, but by the appended claims and their legal equivalents.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A digital system with a plurality of coupled functional units comprising:
a first functional unit with a local clock generation unit generating a local clock having a clock period, a pulse width, and a clock phase;
a clock control unit to control the operation of said local clock generation unit in said first functional unit wherein said clock control unit controls the disabling of said local clock generation;
a security breach detection unit in a functional unit of said digital device to verify validity of operating parameter, said security breach detection unit generating a security alert upon detection of an invalid operating condition;
a transfer mechanism to transfer said security alert to said first functional unit; and
a coupling mechanism in said clock control unit of said first functional unit to couple said security alert to conditionally alter the generation of said local clock.

2. The apparatus of claim 1, wherein said invalid operating condition is determined by validating operator.

3. The apparatus of claim 1, wherein said security breach detection unit detects invalid operating condition when executing pre-defined invalid operations.

4. The apparatus of claim 1, further comprising of an enable logic to re-enable the generation of said local clock.

5. The apparatus of claim 1, wherein said security breach detection unit verifies the validity of the operator using a pre-assigned data comparison mechanism.

6. The apparatus of claim 1, wherein said security breach detection unit verifies the validity of the operator by using biometrics.

7. The apparatus of claim 5, wherein said security breach detection unit verifies the authenticity of the operator using biometrics.

8. The apparatus of claim 1, wherein said security breach detection unit verifies the validity of operations periodically.

9. Apparatus of claim 1, wherein said local clock generation unit comprises of a chain of logic gates to generate said local clock wherein said clock period, clock pulse width, and clock phase may be varied.

10. Apparatus of claim 1, wherein said clock control unit of said first functional unit controls the selection of a synchronization reference clock from a set of reference clocks received from said other functional units.

11. Apparatus of claim 1, wherein said security alert conditionally disables the generation of said local clock in said first functional unit.

12. Apparatus of claim 1, wherein said security alert conditionally increases said period of said local clock thereby slowing said local clock in said first functional unit.

13. Apparatus of claim 1, wherein said security alert conditionally alters said pulse width of said local clock.

14. A method for securing the operations of a Mobile Device comprising:
detecting invalid operating condition and generating a security alert upon detection of said invalid operating condition;
disabling a portion of a mobile device if said verification of the validity of operator fails by disabling the generation of clock to a portion of the mobile device; and
enabling the normal operation of a mobile device if said verification of validity of operator passes.

15. The method of claim 14, wherein detection of invalid operating condition comprises of verifying validity of an operator.

16. The method of claim 15, wherein verifying the validity of the operator comprises a plurality of validation attempts based on a preset validation attempt count.

17. The method of claim 15, wherein verifying the validity of the operator comprises a comparison to a pre-assigned data.

18. The method of claim 14, wherein verifying the validity of operation occurs periodically.

19. The method of claim 14, wherein detection of invalid operating condition comprises of detecting execution of invalid operations.

20. The method of claim 14, further comprising:
verifying said security alert condition; and
removing security alert when invalid operating condition is resolved.

* * * * *